United States Patent [19]

Clelford et al.

[11] 4,313,165
[45] Jan. 26, 1982

[54] FORCE FEEL ACTUATOR WITH LIMITED PROPORTIONAL/INTEGRAL ERROR FEEDBACK

[75] Inventors: Douglas H. Clelford, Trumbull; Donald W. Fowler, West Haven, both of Conn.

[73] Assignee: United Technologies Corporation, Hartford, Conn.

[21] Appl. No.: 87,616

[22] Filed: Oct. 23, 1979

[51] Int. Cl.³ .................... G05B 11/42; B64C 13/04
[52] U.S. Cl. ............................ 364/424; 244/223; 244/227; 318/609; 318/628; 364/161; 364/190
[58] Field of Search ............... 364/105, 118, 120, 424; 244/78, 195, 194, 221, 223, 226, 227, 228, 230, 234, 236; 318/609, 628

[56] References Cited

U.S. PATENT DOCUMENTS

| | | | |
|---|---|---|---|
| 3,476,335 | 11/1969 | Andeen et al. | 318/628 X |
| 3,514,056 | 5/1970 | DiCamillo | 244/227 X |
| 3,521,839 | 7/1970 | Diani | 318/628 X |
| 3,528,633 | 9/1970 | Knemeyer | 244/223 X |
| 3,700,995 | 10/1972 | Parkinson et al. | 318/628 |
| 4,198,017 | 4/1980 | Murray | 244/221 |

Primary Examiner—Joseph F. Ruggiero
Attorney, Agent, or Firm—M. P. Williams

[57] ABSTRACT

A system which provides feel-force to the control stick of an aircraft by means of hydraulic pressure is provided with non-nulling, proportional, direct feedback loop, and a limited integral feedback loop in the drive of the pressure control servo valve that commands the pressure-generating hydraulic force actuator. Static nulls are compensated in the integral path; integration is corrected when the static null and integral output exceed a limiting value. Embodiments include software and/or hardware portions.

6 Claims, 2 Drawing Figures

4,313,165

FORCE FEEL ACTUATOR WITH LIMITED PROPORTIONAL/INTEGRAL ERROR FEEDBACK

The Government has rights in this invention pursuant to Contract No. N00019-75-C-0267 awarded by the Department of the Navy.

DESCRIPTION

TECHNICAL FIELD

This invention relates to systems which induce feel-force in aircraft control sticks by means of hydraulic pressure, and more particularly to improvements in closed-loop control thereof.

BACKGROUND ART

For some time, it has been known to utilize hydraulic actuators connected to the linkage of an aircraft control stick to provide force to the control stick which is dependent in some fashion upon the position of the stick and other aircraft parameters, to indicate to the pilot the degree of command caused by him, which in turn is an indication of the loading of the aircraft surfaces.

In such systems, the position of the stick and other parameters are monitored with suitable transducers and a corresponding force command is generated. As the pilot moves the stick, the force changes commensurately. Such systems also generally have a trim position, which is equivalent to the old style detent wherein the force is a null at a selected position, giving the stick positional stability when in the trim position. Any change in the trim position changes the position/force relationship provided by the force command generator.

Because such force feel systems actually provide a force input to a stick, any erratic behavior thereof will provide actual commands to the control system of the aircraft, unless such force is overcome by the pilot or any automatic flight control systems. For this reason, open-loop force commands are favored only if they are implemented in sufficiently complex systems which can monitor any faulty operation and overcome it, while at the same time not impairing desired operation.

The typical hydraulic force feel system employs hydraulic servo actuators, the mechanical output of which is effective in either the forward or the reverse direction of stick motion directly on the mechanical linkage associated with the cyclic stick. The hydraulic servo actuator is controlled by an electrohydraulic servo valve which has two outputs, one relating to each of the directions of motion of the hydraulic servo actuator, the outputs having together a differential hydraulic pressure which is a function of the magnitude and polarity of a force command signal applied to the valve, the differential hydraulic pressure output determining the force (by the ratio of the area) created by the actuator. Systems of this general type are illustrated in commonly owned U.S. Pat. Nos. 3,733,039 and 3,719,336. One problem with this type of system is that a true null position (zero force for zero electrical signal input to the servo valve) is hard to maintain for long time periods over wide variations of temperature of the hydraulic fluid utilized in the servo valve and the hydraulic servo actuator. Further, amplifier drift and other factors can result in long term drift of the null. To overcome this problem, the system described in commonly owned U.S. Pat. No. 4,078,749 includes means to sense conditions in which the differential pressure should be at a null, such as during trim release with small stick motion, measuring the differential pressure across the actuator at such times, and providing a compensation bias to the system as a function of the differential pressure, which compensation is applied until the next time that a null should occur, when the compensation can be updated. This has the obvious drawback of being intermittent in keeping up-to-date on the offsets, since it does not operate continuously. In addition, this type system does not accommodate changes in hysteresis, bias, linearity and the like which occur at other than the null position.

In many servo systems, it is possible to provide closed-loop control working around a null command. For instance, in a position servo, it is possible to command a certain position, and when that position is reached as indicated by feedback signals, the command is reduced to zero. Any variation in the command results in a command error signal for repositioning the device. In such devices, the use of proportional, integral and other gains in the servo loop is relatively straightforward. However, in hydraulic force feel actuators of the type described herein, a nulling servo loop is not generally possible because the utilization of the pressure control servo valve is preferred for variety of design reasons. In such systems, the maintenance of a given pressure by the force actuator is achievable only by maintaining a differential pressure across its inputs, which in turn requires maintaining a continuous pressure command (for the desired force) at the input of the pressure control servo valve. Therefore, nulling-type servo principles cannot be employed.

DISCLOSURE OF INVENTION

Objects of the invention include improvements in closed-loop drive of hydraulic force feel actuator systems.

According to the present invention, the pressure difference of hydraulic fluid applied to a force feel hydraulic actuator under control of a pressure control servo valve is fed back in a direct non-nulling loop that provides partial, proportional negative feedback to the signal commanding the pressure control servo valve and is also fed back in a remote loop that provides limited, nulling integral feedback to the signal commanding the pressure control servo valve.

The present invention provides improved hydraulic force feel actuator operation in a non-nulling servo loop by means of a specifically controlled combination of direct, partial, proportional feedback and indirect, nulling integral feedback. The invention overcomes instability, hysteresis and drift problems, and provides a measure of compensation against catastrophic failures in the force feel actuator system.

The present invention may be implemented by a combination of a direct analog loop and a remote loop implemented by suitable programming of a digital computer, or it may be implemented wholly in analog fashion.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
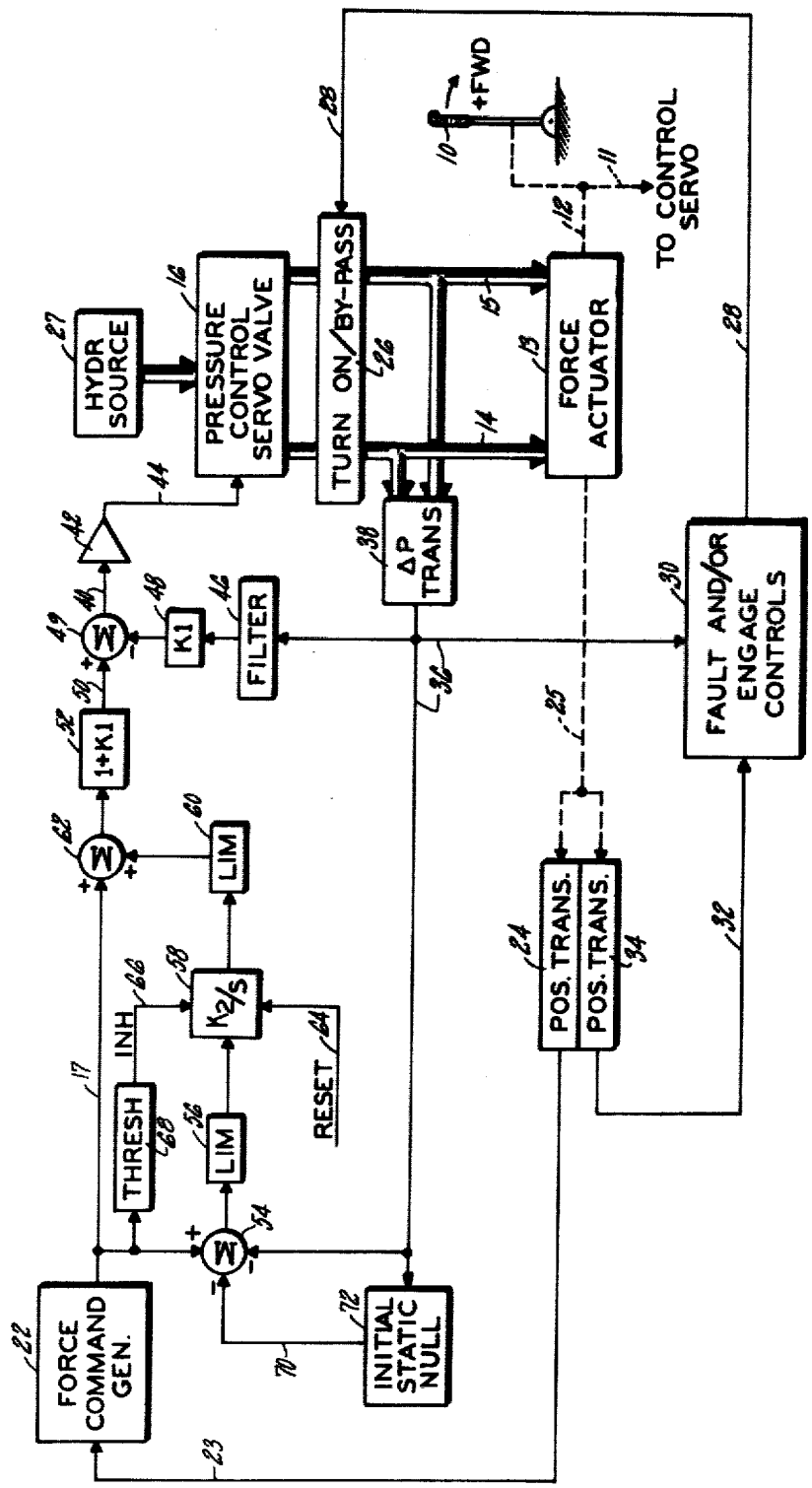
FIG. 1 is a simplified block diagram of a general embodiment of a hydraulic force feel system in accordance with the invention.

Referring now to FIG. 1, a force augmentation system (FAS) recently introduced to the prior art utilizes hydraulic force to provide feel to the control stick 10 of an aircraft, which is assumed for exemplary purposes herein to be the pitch (longitudinal) axis of the cyclic pitch stick of a helicopter.

The stick 10 is provided with mechanical connections 11 to a control servo which include connections 12 to a force actuator 13 which provides a force in either a plus (nose down) or minus (nose up) direction to the stick 10 in response to the difference in hydraulic pressure applied thereto on hydraulic lines 14 and 15, under the control of a pressure control servo valve 16. The servo valve 16 provides a pressure difference between the lines 14 and 15, depending upon the desired magnitude and direction of force, under control of a raw force command signal on a line 17 generated as a function of stick position by a force command generator 22 which may, for instance, be of the type disclosed in U.S. Pat. No. 3,733,039, or it may be of other suitable types. The force command generator is responsive to a stick position signal on a line 23 which is provided by a position transducer 24 which has mechanical connections 25 through the force actuator 13, and other mechanical connections, to the cyclic stick 10.

The servo valve 16 receives hydraulic fluid under pressure from a source of hydraulic fluid under pressure 27 and applies pressure signals through a FAS turn-on/bypass valve 26 to the actuator 13. Although not shown, the hydraulic system includes hydraulic return lines, in the well known fashion. The pressure control servo valve 16 may be of the type disclosed in U.S. Pat. No. 3,862,730. The turn-on valve either connects the servo valve 16 to the force actuator 13, or it disconnects it, and provides bypassing between the lines 14, 15 so as to provide hydraulic damping to the force actuator 13 when the FAS system is disengaged.

The turn-on valve is caused to engage and provide the hydraulic actuator force by means of a turn-on signal on a line 28 which may be provided in any suitable way such as by fault and/or engage controls 30, which may be of the type described in commonly owned copending application Ser. No. 060,093, filed on July 23, 1979 by the inventors hereof and entitled FORCE FEEL ACTUATOR FAULT DETECTION WITH DIRECTIONAL THRESHOLD, or it may be a simple engage circuit, or other suitable apparatus. If the engage controls 30 include fault monitoring, they may receive positional information on a signal line 32 from an additional position transducer 34, or from a single position transducer 24 if redundant safety is not required. The fault controls of the apparatus 30 also require a differential pressure feedback signal on a line 36 which may be provided by a differential pressure transducer 38, in the manner described in our aforementioned copending application.

The present invention relates to the feedback loops which utilize the pressure signal on the line 36 to provide feedback modification of the raw force command signal on the line 17 before it is applied on a line 40 to the input of a servo amplifier 42 so as to provide a suitable command signal on a line 44 at the electric input to the pressure control servo valve 16. The principal feedback loop may include a filter 46, whenever such is deemed necessary so as to reduce potential for oscillations or to filter out noise or the like, the characteristics of which depend solely on the particular embodiment being implemented, determined with well known techniques. The feedback signal may pass through an amplifier 48 having a gain K1, the output of which is subtracted in a summing junction 49, which may comprise the inputs to the amplifier 42 in the well known way, from a signal on a line 50 which is provided by an amplifier 52 with a gain, 1+K1, which is so related to the gain of the amplifier 48 that a full signal will be provided on the line 44 during normal operation; this is because a null cannot be provided to the pressure control servo valve 16 unless a zero pressure (zero force) is desired. The feedback path through the amplifier 48 will reduce the signal on the line 50 by the proportion of K1 to a gain of 1, to provide the signal on the line 40. Assuming, for example, that K1=1, then the signal on the line 40 will be reduced by one-half from the signal on the line 50, when the entire system is operating ideally in a steady state condition.

The feedback just described, being limited to some fraction (K1+K1+1) cannot reduce any errors to zero, but it can provide instantaneous and significant reduction of any errors, with few instability constraints. In order to reduce long term errors to zero, an additional feedback path is provided which is upstream of the amplifier 52. This path provides the difference between the force command signal on the line 17 and the pressure difference signal on the line 36, in a summing junction 54, to provide (in some cases) a fully-nulled error signal to a limiter 56, the output of which is passed through an integrator 58 and an additional limiter 60 to a summing junction 62 which sums the integrated error with the force command signal on the line 17. The polarity at the summing junction 62 is such that the effect of the pressure difference signal on the line 36 is negative and therefore corresponds to degenerative feedback whereas the polarity of the component representing the force command signal is positive and represents a regenerative feed forward input.

The integrator 58 may be reset by a signal on a line 64 at convenient times, such as during a power-on reset or during a null balance while the aircraft is on the ground, in any well known fashion. In the present embodiment, the integrator 58 is inhibited from integration (that is, put into a hold state in which its output remains constant) by a signal on a line 66 in response to an output from a threshold detector 68 which provides such signal whenever the command force signal on the line 17 indicates an excessive force (such as more than 4 lbs.). This feature causes the integral feedback loop to be inoperative when there are large pressure differentials resulting from high pilot inputs due to rapid motion of the stick 10. Therefore, only the long term, small errors are zeroed out by the nulling, integral feedback loop; during fast motion of the stick, the proportional feedback loop through the amplifier 48 reduces errors substantially by some fraction. And, since the types of errors which can occur during the short term, while the pilot is in fact maneuvering the stick for a desired result, are of relatively lesser effect, reduction of such errors by a fraction (such as one half) on a rapid basis is quite adequate.

Taken together, the two feedback loops provide substantial, though less than complete, error reduction on a short term basis by means of a partial, proportional feedback, and also reduce long term, small errors to a complete nullity by means of the integral feedback loop. The integral feedback is effective to completely null out all errors not accommodated by the short term proportional feedback loop because of the fact that the summation with the force command signal in the summing junction 62 is ahead of the amplifier 52, and therefore full unity gain of the combined signal from the junction 62 is available at the output of the summing junction 49.

The voltage limiter 56 limits the input to the integrator 58, thereby limiting the rate of change of the output of the integrator 58. This provides for a controlled rate of correction in the force command signal on the line 17. This may be eliminated, if desired in a given implementation. The limiter 60, on the other hand, limits the degree to which the force command signal can be dominated by the integral gain feedback loop. These limits may be adjusted to suit any given implementation of the invention. In some cases, either or both limiters may be eliminated where desired if the functions thereof are not needed, without departing from the invention. However, the limiter 60 prevents failures of the pressure transducer 38 from being compensated beyond a certain degree; this prevents the integral error compensation from masking faults. And the limiter 60 reduces catastrophic effects of faults in the integral gain loop.

Static nulls cannot be fully compensated in the loop through amplifier 48, so they are compensated through the integral loop. The junction 54 has a static null compensating input on a line 70 generated during initialization by initial static null circuits 72. These may simply register a value effective to compensate for any pressure differential during a time of null, on lines 36, by means which are obvious in view of the teachings of U.S. Pat. No. 4,078,749. This is not required in the invention, and may be accommodated otherwise.

If desired, a small dither signal could be introduced at the junction 62, to overcome static drag and hysteresis.

Figure 2:
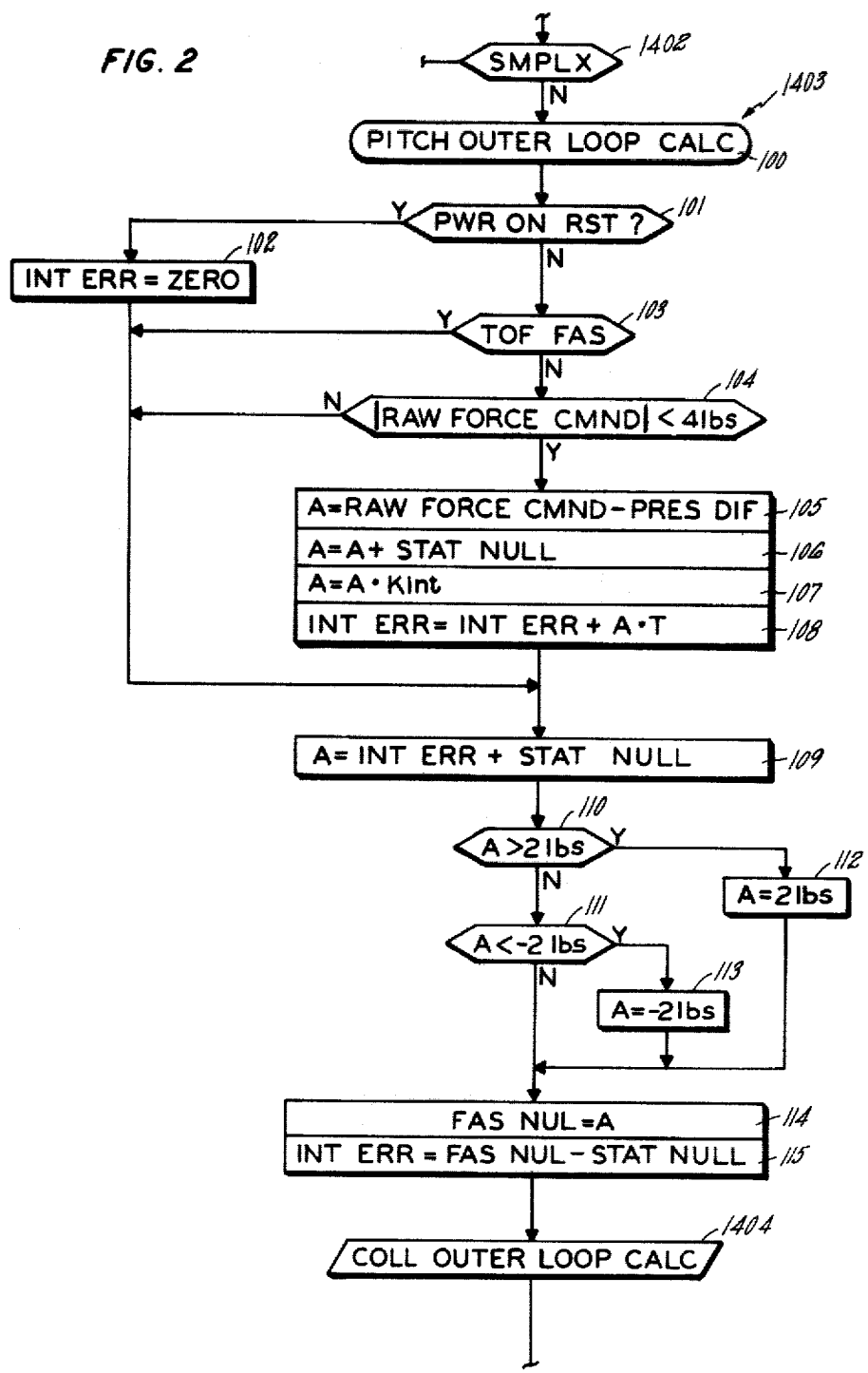
FIG. 2 is a logic flowchart illustrative of a program for carrying out a portion of the present invention in a computer embodiment.

The integral gain loop, including the summing junction 54, the limiters 56, 60, the integrating amplifier 58 and the summing junction 62, together with the amplifier 52, the force command generator 22 and the initial static null circuit 72 comprises signal processing means which may all be implemented in analog form as is illustrated in FIG. 1, or they may be implemented in a digital computer, such as the type disclosed in a commonly owned copending application of Murphy and Clelford, Ser. No. 938,583, filed on Aug. 31, 1978, and entitled FAIL-OPERATIONAL, FAIL-SAFE MULTI-COMPUTER CONTROL SYSTEM, now U.S. Pat. No. 4,270,168. In such case, the integral feedback loop may be implemented in a fashion illustrated in FIG. 2.

A digital implementation of the integral feedback loop may be performed in the embodiment of a computer system in said copending application within step 1403 (FIG. 14), by commencing through an entry point 100 (FIG. 2, herein) to a test 101 which determines if there is a power on reset; if so, a step 102 will reset the integrator. If not, a test 103 will determine if the force augmentation system is turned off (as in, for instance, steps 1516, 1524a, FIG. 15 or step 1802, FIG. 18, of said copending application). If it is, no calculations are made. But if the force augmentation is not turned off, then a test 104 determines whether high raw force commands are being generated as a consequence of pilot stick motion. If so, no calculations are made, but if not, then a working factor referred to as "A" is generated as the difference between the raw force command and the pressure difference summed with the static null in steps 105 and 106 (which are equivalent to the summing junction 54 in FIG. 1). Then, "A" is multiplied by a gain and then by a fixed time increment, "T", and then is added to a previous integrated result to perform well known rectangular integration in steps 107 and 108, which are equivalent to the integrator 58 in FIG. 1. Thereafter, in step 109, the factor "A" becomes the sum of the integrator output and the original static null which provides the static null in a raw form, in a feed-forward fashion, thereby obviating the need to take a long time to integrate upwardly to compensate for the static null error. This is different than the embodiment of FIG. 1 and is illustrative of the various ways in which the invention may be practiced. If desired, the embodiment of FIG. 1 could have a summing junction provided to introduce the static null directly upstream of the integrator 58, in a well known fashion, thereby causing that embodiment to be more like the embodiment of FIG. 2. Then in steps 110 and 111, it is determined whether or not the total feedback factor exceeds a feedback factor equivalent to 2 lbs., and if it does it is corrected in steps 112, 113, depending upon the polarity. The basic output of the integral path itself is then set to the value "A" in step 114, after the 2 lb. limiting. In step 115, the integral output is corrected to equal the 2 lb. corrected output minus the static null so that the value accumulated in the integrator itself will be such that, when added to the static null, should not exceed 2 lbs.. This prevents the output of the integral path from continuously growing to values, which with static null added thereto, far exceed the 2 lb. limit; if such correction were not provided, inputs of an opposite sense would be masked by the excess of the integral output over the 2 lb. limit. By correcting any excessive integral output to a value of 2 lb.±static null value, any change in the sense (increasing or decreasing) of the force feel pressure will be immediately apparent in the limited output (step 114).

Step 115 is the last step of the pitch outer loop calculation equivalent to the integral feedback path. The integral feedback path output, FAS NUL, is thereafter added to the raw force command signal and multiplied by the constant 1+K1 in an obvious manner, which may be implemented in the aforementioned copending application in subroutine 519 (FIG. 5) and again in subroutine 904 (FIG. 9) of the aforementioned copending application, which subroutines provide two pitch force augmentation calculations in each overall macro synch interrupt (each basic computer cycle). And the results of these calculations may be outputted to the analog portion of the system (such as summing junction 49 in FIG. 1) by step 703 (FIG. 7) and step 1003 (FIG. 10) in the aforementioned copending application.

The actual generation of the force command, as indicated by the force command generator 22 in FIG. 1, may be implemented using ordinary programming techniques to provide the functions set forth in the aforementioned U.S. Pat. No. 3,733,039. Or, it may be implemented in a different, suitable format in accordance with the skill of the art.

The feedback system has been described thus far in terms of a single channel of feedback. As described in the aforementioned copending application, however, it may as well be implemented in a system utilizing two control channels, with half of the gain for the pressure control servo valve 16 being provided by each control channel, whether the control systems are implemented by suitable programming of a digital computer as described in the copending application, or by dual analog circuitry of the type described in FIG. 1 herein. In such case, the position transducer 24 for one of the channels may provide the fault detection for the other channel and the position transducer 34 for the other channel might provide the fault detection for the first channel (as in FIG. 1). Similarly, a feedback test to determine the viability of the actual pressure differential on the line 36 may be performed, as indicated in steps 1006 and 1012-1016 in FIG. 10 of the aforementioned copending application, each channel comparing its pressure transducer to that of the other. Also, the fault and/or engage controls of FIG. 1 herein could use a differential pressure signal provided by a second pressure transducer, for redundant safety in a single channel embodiment, if desired. However, the use of single or dual channels, half or full gain, feedback tests, fault detection and the like form no part of the present invention, and are deemed to be within the skill of the art.

Although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. An aircraft control stick force feel actuator system comprising:

an electrically controlled, hydraulic pressure control servo valve;

a hydraulic actuator connected to the control stick and operable in response to differential fluid pressure applied to opposite ends of the actuator to provide a force to the stick having a magnitude and direction proportional to the fluidic pressure applied to the actuator, said hydraulic pressure being applied to the actuator in response to said servo valve;

means responsive to the pressure applied to each end of said hydraulic actuator to provide a pressure signal indicative of the pressure difference therebetween;

signal processing means for generating a force signal indicative of a raw force command corresponding to a desired force on the control stick, responsive to said force signal and to said pressure signal for providing a force error signal indicative of the difference between said pressure signal and said force signal, for integrating the force error signal to provide an integral feedback signal, and for providing a force command signal indicative of the summation of the integral feedback signal and the force signal;

means providing a proportional error signal as the sum of a first proportion of said force command signal and a second proportion of said pressure signal, said second proportion being a fraction of said first proportion; and means responsive to said proportional error signal for providing a force commanding input signal to said electrically controlled, hydraulic pressure control servo valve.

2. An aircraft control stick force feel actuator system according to claim 1 wherein said signal processing means further comprises means for limiting said integral feedback signal to a small fraction of a permitted maximum value of said force signal.

3. An aircraft control stick force feel actuator system according to claim 1 wherein said processing means includes means responsive to said force signal to inhibit the integration of said force error signal in dependence on said force signal representing a force command in excess of threshold value indicative of pilot stick motion.

4. An aircraft control stick force feel actuator system according to claim 1 wherein said signal processing means further comprises means for providing a static null compensation signal and for providing said force command signal in partial dependence on said static null compensation signal.

5. An aircraft control stick force feel actuator system according to claim 4 wherein said signal processing means comprises a digital signal processor in which said static null signal is added to said force error signal and to said integral feedback signal.

6. An aircraft control stick force feel actuator system according to claim 1 wherein said signal processing means further comprises means for limiting the summation of said integral feedback signal and said static null signal to a small fraction of a permitted maximum value of said force signal and for correcting said integral feedback signal to be equal to said small fraction of said permitted maximum value of said force signal minus said static null signal.

* * * * *